United States Patent
Muddana et al.

(10) Patent No.: US 9,260,041 B2
(45) Date of Patent: Feb. 16, 2016

(54) LOCKING ASSEMBLY FOR VEHICLE

(71) Applicant: Honda Motor Co., Ltd., Tokyo (JP)

(72) Inventors: Raj K. Muddana, Dublin, OH (US);
Masaki Shimazu, Dublin, OH (US);
Paul D. Nguyen, Hilliard, OH (US);
Yuji Kubota, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 60 days.

(21) Appl. No.: 14/222,873

(22) Filed: Mar. 24, 2014

(65) Prior Publication Data

US 2015/0266400 A1    Sep. 24, 2015

(51) Int. Cl.
*B60N 2/00* (2006.01)
*B60N 2/36* (2006.01)

(52) U.S. Cl.
CPC .............. *B60N 2/366* (2013.01); *B60N 2205/20* (2013.01)

(58) Field of Classification Search
CPC ............................ B60N 2/366; B60N 2205/20
USPC ............................................ 296/65.16, 37.16
See application file for complete search history.

(56) References Cited

U.S. PATENT DOCUMENTS

| | | | |
|---|---|---|---|
| 3,901,100 A | 8/1975 | Iida et al. | |
| 4,813,722 A * | 3/1989 | Viscome | B60N 2/366 292/216 |
| 5,240,309 A | 8/1993 | Köjer | |
| 6,227,619 B1 | 5/2001 | Pesta et al. | |
| 6,402,250 B1 | 6/2002 | Lange | |
| 6,502,903 B2 | 1/2003 | Bruck et al. | |
| 6,883,854 B2 | 4/2005 | Daniel | |
| 7,044,543 B2 | 5/2006 | Schumann et al. | |
| 7,364,236 B2 | 4/2008 | Gabalski et al. | |
| 7,896,441 B2 | 3/2011 | Krahn-Lau et al. | |
| 8,348,345 B2 | 1/2013 | Muller et al. | |
| 2010/0171351 A1 | 7/2010 | Thiel et al. | |
| 2011/0215627 A1 | 9/2011 | Wieclawski | |
| 2012/0146370 A1 | 6/2012 | Lee et al. | |

FOREIGN PATENT DOCUMENTS

JP    2005263109    9/2005

* cited by examiner

*Primary Examiner* — Joseph D Pape
(74) *Attorney, Agent, or Firm* — Rankin, Hill & Clark LLP (57) ABSTRACT

A locking assembly for a vehicle includes a striker mounted to a first vehicle part movable between a first position and a second position, a ratchet rotatably mounted to a second vehicle part for selectively receiving the striker and locking the first vehicle part in the first position, a pawl rotatably mounted to the second vehicle part for selectively engaging the ratchet to prevent rotation of the ratchet and thereby lock the ratchet and striker together, an anti-rattle lever rotatably mounted to the second vehicle part for engaging the striker to prevent rattling of the ratchet on the striker and a spring mounted to the second vehicle part to urge the anti-rattle lever into engagement with the striker when the ratchet is locked to the striker. The spring is arranged to maintain locking of the ratchet onto the striker in the event that the anti-rattle lever fails.

20 Claims, 6 Drawing Sheets

LOCKING ASSEMBLY FOR VEHICLE

BACKGROUND

Various types of locking assemblies are known for locking a first vehicle part to a second vehicle part. Typically, a striker is mounted to a first vehicle part and some type of locking ratchet is mounted to a second vehicle part. One or both of the vehicle parts can be movable relative to the other unless the ratchet is latched or locked onto the striker. In one example, a pawl can be used to maintain the locked position of the ratchet until the pawl is rotated to release the ratchet and thereby release the striker to unlock the vehicle parts from one another.

In one known arrangement, a striker is mounted to one of a vehicle seat and a vehicle body portion to which the vehicle seat is lockable and a ratchet is mounted to the other of the vehicle seat and the vehicle body portion with a pawl also mounted to the same vehicle part as the ratchet for selectively maintaining the ratchet in a locked position on the striker. One common problem associated with this type of locking assembly is rattling of the ratchet and striker relative to one another. Another problem associated with this type of locking assembly is ensuring that any anti-rattling countermeasures are effective even in the event of a vehicle crash where the anti-rattling feature is damaged and/or disabled.

SUMMARY

According to one aspect, a locking assembly for a vehicle includes a striker mounted to a first vehicle part movable between a first position and a second position, a ratchet rotatably mounted to a second vehicle part for selectively receiving the striker and locking the first vehicle part in the first position, and a pawl rotatably mounted to the second vehicle part for selectively engaging the ratchet to prevent rotation of the ratchet and thereby lock the ratchet and striker together. The locking assembly further includes an anti-rattle lever rotatably mounted to the second vehicle part for engaging the striker to prevent rattling of the ratchet on the striker and a spring mounted to the second vehicle part to urge the anti-rattle lever into engagement with the striker when the ratchet is locked to the striker. The spring is arranged to maintain locking of the ratchet onto the striker in the event that the anti-rattle lever fails.

According to another aspect, a vehicle seat locking assembly is provided for maintaining integrity of a locking condition in the event of a failure of an anti-rattling feature. The vehicle seat locking assembly includes a striker mounted to one of a vehicle seat and a vehicle body portion to which the vehicle seat is lockable and a ratchet rotatably mounted to the other of the vehicle seat and the vehicle body portion. The ratchet is movable between a first position wherein the striker is movable relative to the ratchet and a second position wherein the striker is inhibited from moving relative to the ratchet. The locking assembly further includes a pawl rotatably mounted to the same one of the vehicle seat and the vehicle body portion as the ratchet, wherein the pawl is arranged to selectively lock the ratchet in the second position. The locking assembly further includes an anti-rattle lever contacting the striker when the striker is locked by the ratchet with the ratchet in the second position and a spring arranged to urge the anti-rattle lever into contact with the striker and further arranged to engage the ratchet if the anti-rattle lever breaks. The anti-rattle lever inhibits rattling between the striker and the ratchet.

According to a further aspect, a spring arrangement for a vehicle seat locking assembly includes a torsion spring rotatably mounted together with a ratchet, a pawl and an anti-rattle lever. The spring arrangement additional includes one end of the torsion spring arranged to be in contact with the anti-rattle lever to urge the anti-rattle lever into contact with an associated striker when the ratchet is locked to the associated striker. Said one end of the spring has a ratchet engagement portion arranged to contact the ratchet in the event that the anti-rattle lever fails but is normally arranged in spaced apart relation relative to the ratchet.

DETAILED DESCRIPTION

Referring now to the drawings wherein the showings are for purposes of illustrating one or more exemplary embodiments and not for purposes of limiting the same, a locking assembly 10 is illustrated for a vehicle 12 according to an exemplary embodiment. The locking assembly 10 includes a striker 14 mounted to a first vehicle part (e.g., a vehicle seat 30 or seatback 34) that is movable between a first position (e.g., the position shown in FIG. 1) and a second position (e.g., a fold-down position, not shown). The locking assembly 10 further includes a ratchet 16 (FIGS. 4 and 5) rotatably mounted to a second vehicle part (e.g., a vehicle body portion such as a parcel shelf structure 32) for selectively receiving the striker 14 and locking the first vehicle part in the first position. The ratchet 16 can be formed of a metal or metal alloy.

Figure 4:
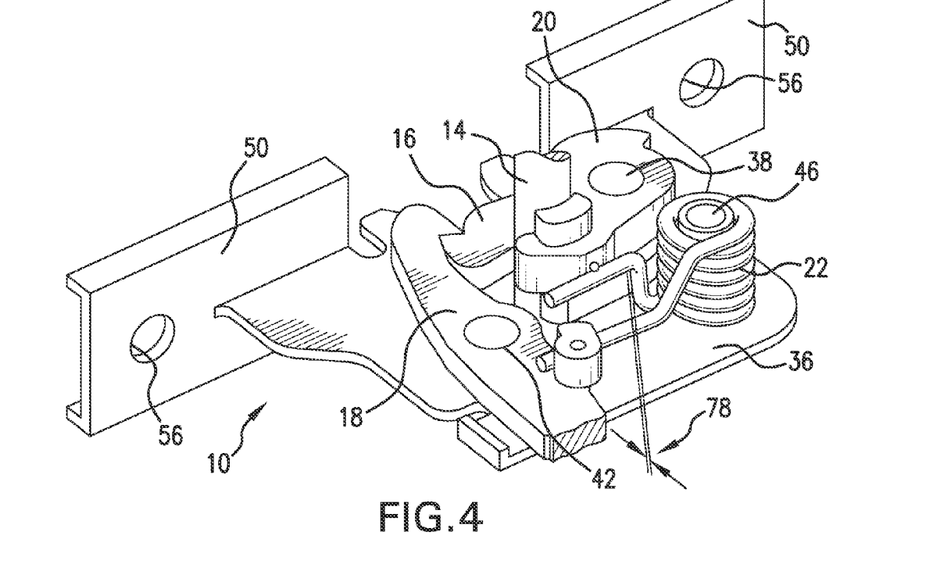
FIG. 4 is a partial perspective view of the locking assembly shown removed from the vehicle and the parcel shelf structure.
Figure 5:
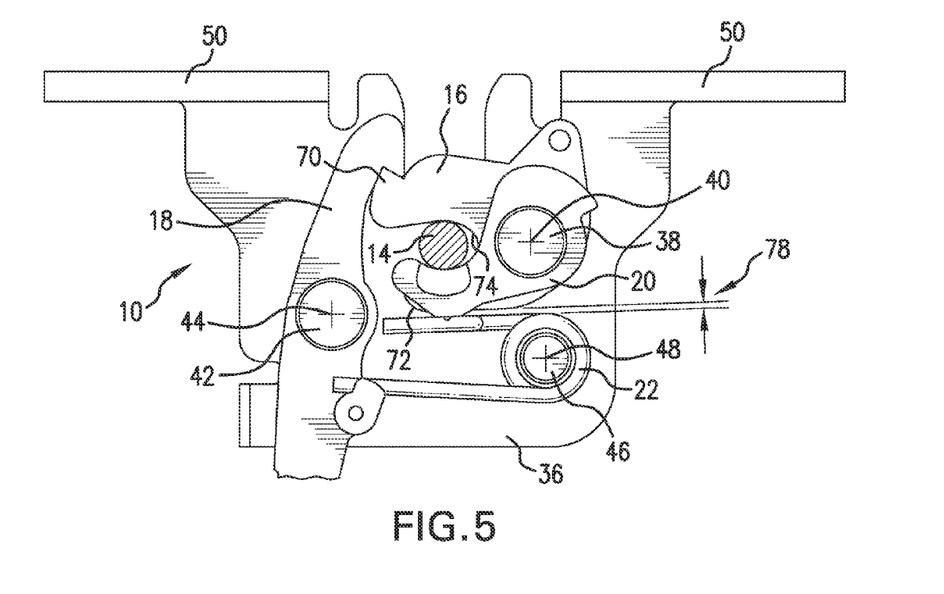
FIG. 5 is a top plan view of the vehicle seat locking assembly of FIG. 4.
Figure 6:
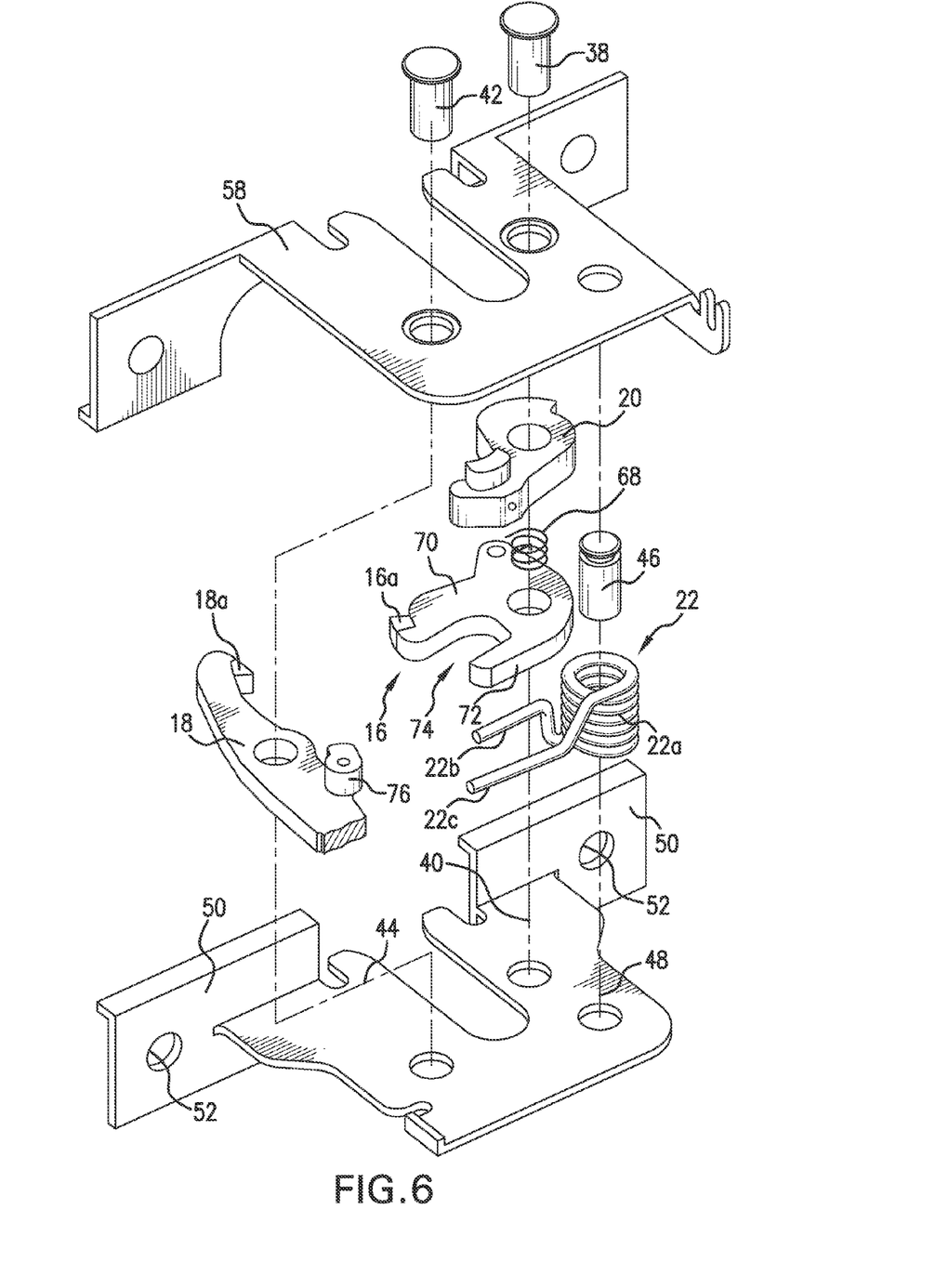
FIG. 6 is an exploded partial perspective view of the vehicle seat locking assembly of FIG. 4.

The locking assembly further includes a pawl 18, an anti-rattle lever 20 and a spring 22, all illustrated in FIGS. 4-6. More particularly, the pawl 18 is rotatably mounted to the second vehicle part (i.e., the same vehicle part to which the ratchet 16 is rotatably mounted) for selectively engaging the ratchet 16 to prevent rotation of the ratchet 16 and thereby lock the ratchet 16 and the striker 14 together. The anti-rattle lever 20, which can be formed of a plastic material to improve its anti-rattling functionality, is rotatably mounted to the second vehicle part (i.e., the same vehicle part to which the ratchet 16 and pawl 18 are mounted) for engaging the striker 14 to prevent rattling of the ratchet 16 on the striker 14. The spring 22 is likewise mounted to the second vehicle part (i.e., the same vehicle part to which the ratchet 16, the pawl 18 and the anti-rattle lever 20 are mounted) to urge the anti-rattle lever 20 into engagement with the striker 14 when the ratchet 16 is locked to the striker 14. As will be described in more detail below, the spring 22 is arranged to maintain locking of the ratchet 16 onto the striker 14 in the event that the anti-rattle lever 20 fails.

The illustrated embodiment features the locking assembly 10 as a vehicle seat locking assembly for maintaining integrity of a locking condition between a vehicle seat 30 and a vehicle body portion 32 in the event of a failure of an anti-rattling feature, though the locking assembly 10 could be used to selectively lock together other vehicle parts in the vehicle 12. More particularly, in the illustrated embodiment, the first vehicle part is one of a vehicle seat 30 and a vehicle body portion 32 to which the vehicle seat 30 is lockable. The second vehicle part is the other of the vehicle seat 30 and the vehicle body portion 32. As shown, the vehicle body portion 32 can be a parcel shelf structure disposed rearward of the vehicle seat 30. More particularly, the vehicle body portion 32 can be a parcel shelf structure arranged near an upper end 34a of a vehicle seatback 34. Accordingly, the striker 14 is mounted to one of the vehicle seat 30 and the vehicle body portion 32 to which the vehicle seat 30 is lockable.

The ratchet 16 is rotatably mounted to the other of the vehicle seat 30 and the vehicle body portion 32. As will be described in more detail below, the ratchet 16 is movable between a first position wherein the striker 14 is movable relative to the ratchet 16 and a second position wherein the striker 14 is inhibited from moving relative to the ratchet 16. The pawl 18, the anti-rattle lever 20 and the spring 22 are mounted to the other of the vehicle seat 30 and the vehicle body portion 32 (i.e., are mounted opposite the striker 14 and to the same vehicle part as the ratchet 16). More particularly, in the illustrated embodiment, the striker 14 is mounted to the vehicle seat 30 and the ratchet 16, the pawl 18, the anti-rattle lever 20 and the spring 22 are collectively mounted to the vehicle body portion 32 which is in the form of a parcel shelf structure. The anti-rattle lever 20 contacts the striker 14 when the striker 14 is locked by the ratchet 16 with the ratchet 16 in the second position. The anti-rattle lever 20 functions to inhibit rattling between the striker 18 and a ratchet 16. The spring 22 is arranged to urge the anti-rattle lever 20 into contact with the striker 14 and further arranged to engage the ratchet 16 if the anti-rattle lever 20 breaks or fails (e.g., in the event of a vehicle collision).

Figure 1:
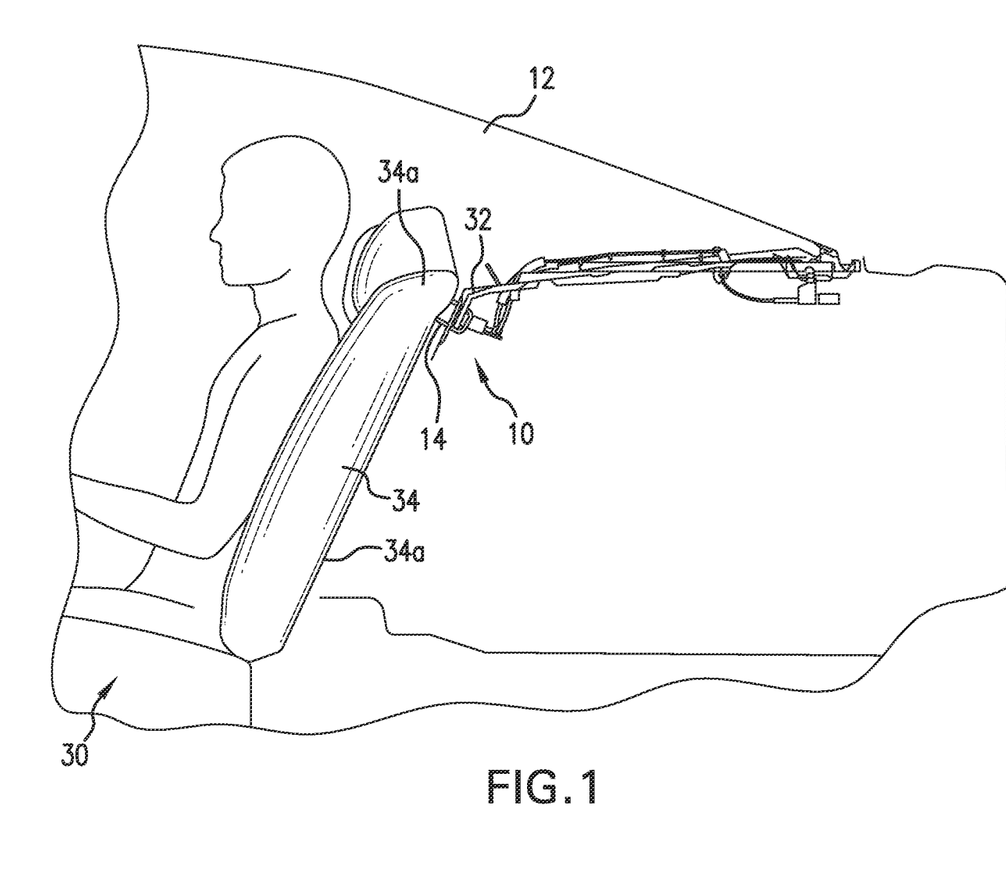
FIG. 1 is a partial elevational schematic view of a vehicle seat locking assembly illustrated in a locked condition wherein a vehicle seat is locked to a vehicle body portion (e.g., a parcel shelf structure) according to an exemplary embodiment.
Figure 2:
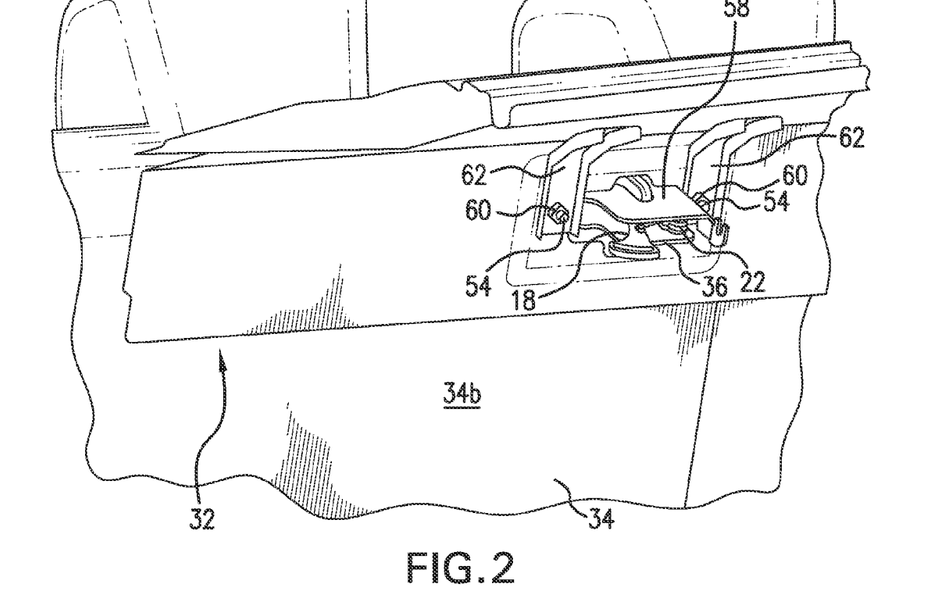
FIG. 2 is a partial perspective view of the vehicle seat locking assembly showing the locking assembly from the rear side of the parcel shelf structure mounted in the vehicle.
Figure 3:
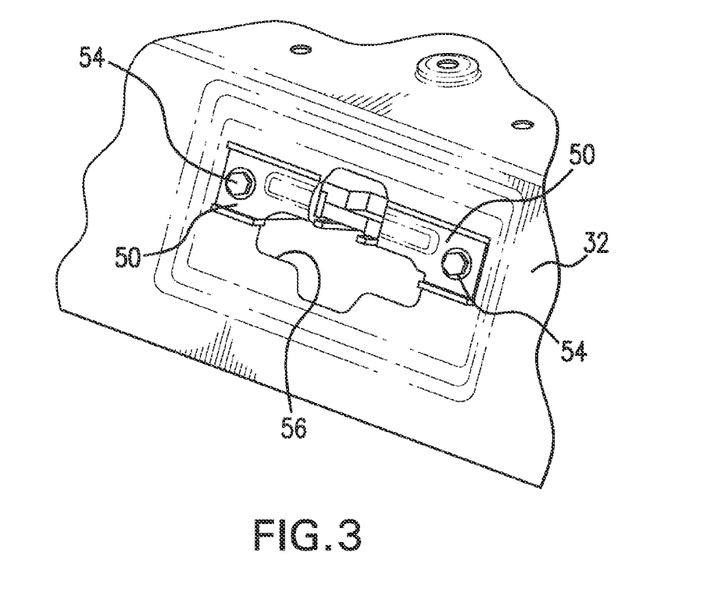
FIG. 3 is a partial perspective view of the vehicle locking assembly showing the locking assembly from a front side of the parcel shelf structure.

In the illustrated embodiment, as best shown in FIG. 1, the striker 14 is a U-shaped striker mounted to the rear side 34b of the vehicle seatback 34. The ratchet 16, the pawl 18, the anti-rattle lever 20 and the spring 22 are each rotatably mounted to a mounting plate 36, as shown in FIGS. 4-6, and the mounting plate 36 is fixedly secured to the vehicle body portion 32, as shown in FIGS. 1-3, thereby mounting the ratchet 16, the pawl 18, the anti-rattle lever 20 and the spring 22 to the vehicle body portion 32. More particularly, and with specific reference to FIGS. 4-6, the ratchet 16 and the anti-rattle lever 20 can be commonly mounted by a pin 38 to the mounting plate 36 for rotation about a common axis 40. The pawl 18 can be rotatably mounted to the mounting plate 36 by a pin 42 for rotation about an axis 44. Likewise, the spring 22 can be rotatably mounted to the mounting plate 36 by a pin 46 for rotation about an axis 48. The mounting plate 36 of the illustrated embodiment can include one or more mounting flanges 50 (two shown in the illustrated embodiment) each having a fastener or mounting aperture 52. As shown in FIGS. 2 and 3, the mounting apertures 52 are for receipt of fasteners 54 that secure or mount the mounting plate 36 to the vehicle body portion 32 (i.e., the parcel shelf structure in the illustrated embodiment).

As best shown in FIG. 3, the vehicle body portion 32 can define an aperture 56 that allows the striker 14 mounted to the vehicle seatback 34 to pass through the vehicle body portion 32 for engagement with the ratchet 16 and the anti-rattle lever 20. A further mounting plate 58 can be provided in spaced relation above the mounting plate 36 above the ratchet 16, the pawl 18, the anti-rattle lever 20 and the spring 22 as best shown in FIG. 2. Threaded members 60 (e.g., nuts) can be received on the fasteners 54 to secure the mounting plate 36 of the locking assembly 10 to the vehicle body portion 32 and, optionally, reinforcement braces 62 can be secured to a rear side of the vehicle body portion 32 by the fasteners 54

Referring to FIGS. 4-6, the ratchet 16 of the illustrated embodiment is generally U-shaped with a first leg 70 positioned on one side of the striker 14 when the ratchet 16 is in the second position (i.e., the locked position) and a second leg 72 positioned on the other side of the striker 14 when the ratchet 16 is in the second position (i.e., the locked position). A recess 74 is defined between the first leg 70 and the second leg 72 for receiving the striker 14. By this arrangement, the first leg 70 and the second leg 72 inhibit movement of the striker 14 when the ratchet 16 is in the second position and thereby inhibit movement of the first vehicle part (e.g., inhibit movement of the vehicle seat 30 and particularly the vehicle seatback 34 relative to the vehicle body portion 32 in the illustrated embodiment). For example, when the ratchet 16 is in the second position, the first and second leg 70, 72 of the ratchet 16 prevent relative movement of the vehicle seatback 34 (e.g., the vehicle seatback 34 cannot be folded down).

When the striker 14 is locked by the ratchet 16, rotation of the ratchet 16 in a first rotatable direction (e.g., clockwise in FIG. 5) back to the first position (i.e., the unlocked position) is prevented by the pawl 18. In particular, the pawl 18 includes an engaging portion 18a that cooperatively engages with an engaging portion 16a of the first leg 70 of the ratchet 16. The pawl 18 can be rotated (e.g., counterclockwise in FIG. 5) to disengage the engaging portions 18a, 16a and thereby allow the ratchet 16 to rotate in the first rotatable direction back to the first position. A ratchet spring 68 can be provided in association with the ratchet for biasing the ratchet in the first rotatable direction (i.e., clockwise in FIG. 5). The ratchet 16 is permitted to overstroke when moving from the first position to the second position but generally is prevented or inhibited from rotating in a second, opposite rotatable direction (e.g., counterclockwise in FIG. 5) by the ratchet spring 68.

In the illustrated embodiment, the spring 22 is a torsion spring having a coiled portion 22a wrapped around the pin 46. The torsion spring 22 has one end (i.e., a first end 22b) arranged to be in contact with the anti-rattle lever 20. Also, the first end 22b is arranged to be slightly spaced apart from the ratchet 16, and particularly the second leg 72 of the ratchet 16, and only contacts the ratchet 16 in the event that the anti-rattle lever 20 fails. The torsion spring 22 has another end (i.e., a second end 22c arranged to be in contact with the pawl 18). In particular, the second end 22c is engaged with a protruding portion 76 disposed on the pawl 18. By this arrangement, the spring 22 is engaged with the anti-rattle lever 20 when the striker 14 is locked by the ratchet 16 and a small clearance gap 78 is defined between the second leg 72 of the ratchet 16 and the spring 22, particularly the first end 22b of the spring 22, such that the spring 22 only engages the second leg 72 of the ratchet 16 in the event that the anti-rattle lever 20 fails. Such an event might be a collision involving the vehicle 12 wherein damage is done to the vehicle 12, including damage to the anti-rattle lever 20.

Figure 7:
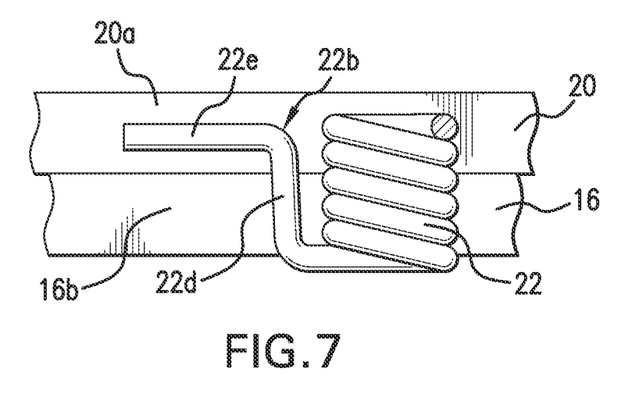
FIG. 7 is a partial underside view showing a spring of the vehicle seat locking assembly arranged relative to a ratchet and an anti-rattle lever of the vehicle seat locking assembly.
Figure 8:
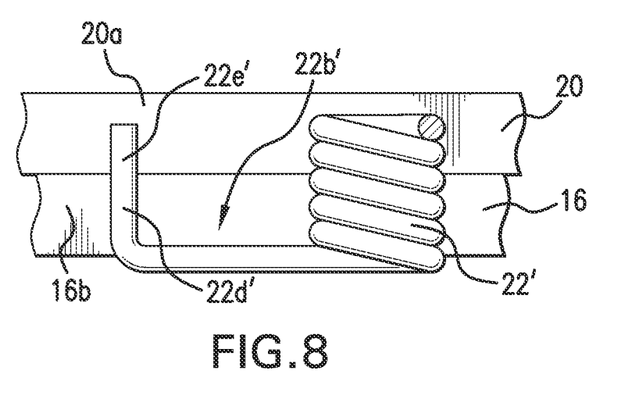
FIG. 8 is a partial underside view similar to FIG. 8 but showing a spring of a vehicle seat locking assembly according to an alternate exemplary embodiment.

With additional reference to FIG. 7, the first end 22b is arranged in a Z-shaped configuration with a center portion 22d arranged to extend across a contact area 16b of the ratchet 16 and a distal portion 22e arranged to extend along a contact area 20a of the anti-rattle lever 20, though other configurations could be used (e.g., see FIG. 8). By this arrangement, the first end 22b of the spring 22 is arranged adjacent the second leg 72 of the ratchet 16 but with a small clearance 78 (best shown in FIGS. 4 and 5) defined therebetween, particularly the clearance 78 is defined between the contact portion 16b of the ratchet 16 and the center portion 22d of the spring 22. Thus, the Z-shaped configuration of the first end 22b of the spring 22 functions to bridge over the ratchet 16, and particularly the contact area 16b of the ratchet 16, while defining the small clearance 78 therewith, and is configured to engage a side of the anti-rattle lever 20, the side having the contact portion 20a, opposite the striker 14 to thereby urge the anti-rattle lever 20 toward the striker 14. This prevents rattling between the ratchet 16 and the striker 14.

By the foregoing, a spring arrangement for a vehicle seat locking assembly is provided. More particularly, in the illustrated embodiment, the torsion spring 22 is rotatably mounted together with the ratchet 16, the pawl 18 and the anti-rattle lever 20. The first end 22b of the torsion spring 22 is arranged to be in contact with the anti-rattle lever 20 to urge the anti-rattle lever 20 into contact with the striker 14 when the ratchet 16 is locked to the striker 14. The first end 22b has a ratchet engagement portion (i.e., the center portion 22d) arranged to contact the ratchet 16 in the event that the anti-rattle lever 20 fails but is normally arranged in spaced apart relation relative to the ratchet 16. As the anti-rattle lever is formed of a plastic material it provides non-rattling contact with the striker 14 but is more susceptible to breakage or failure due to its plastic material composition. The arrangement of the spring whereby the center portion 22d contacts and engages the ratchet 16 in the event of the anti-rattle lever 20 failing provides back-up in such an event and allows the locking assembly 10 to continue to function to lock the striker 14 via the ratchet 16 and prevent relative rotation between the vehicle seat 30 and the vehicle body portion 32.

With reference now to FIG. 8, a spring 22' is shown according to an alternate exemplary embodiment and can be substituted for the spring 22 in the lock assembly 10. The spring 22' can function the same or similar to the spring 22 described hereinabove. Thus, the spring 22' is arranged to maintain locking of the ratchet 16 onto the striker 14 in the event that the anti-rattle lever 20 fails. In particular, the spring 22' has a first end 22b' arranged to be in contact with the anti-rattle lever 20 but slightly spaced apart from the ratchet 16 unless the anti-rattle lever 20 fails, in which case the first end 22b' can engage or contact the ratchet 16 to maintain the ratchet 16 in a locked state on the striker 14. As shown, the first end 22b' is arranged in an L-shaped configuration with a center portion 22d' arranged to extend across the contact area 16b of the ratchet 16 (and be spaced slightly apart from the contact area 16b) and a distal portion 22e' arranged adjacent and in contact with the contact area 20a of the anti-rattle lever 20. It is to be appreciated by those skilled in the art that the spring and particularly the first end thereof need not be configured exactly as shown in FIGS. 7 and 8. Other configurations could be used wherein a portion of the first end of the spring normally engages or contacts the anti-rattle lever 20 and another portion of the first end of the spring is spaced apart slightly from the ratchet 16 but arranged to engage or contact the ratchet 16 if the anti-rattle lever 20 fails to maintain the locking state of the ratchet 16.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A locking assembly for a vehicle, comprising:
   a striker mounted to a first vehicle part movable between a first position and a second position;
      a ratchet rotatably mounted to a second vehicle part for selectively receiving the striker and locking the first vehicle part in the first position;
   a pawl rotatably mounted to the second vehicle part for selectively engaging the ratchet to prevent rotation of the ratchet and thereby lock the ratchet and the striker together;
   an anti-rattle lever rotatably mounted to the second vehicle part for engaging the striker to prevent rattling of the ratchet on the striker; and
   a spring mounted to the second vehicle part to urge the anti-rattle lever into engagement with the striker when the ratchet is locked to the striker, the spring arranged to maintain locking of the ratchet onto the striker in the event that the anti-rattle lever fails.

2. The locking assembly of claim 1 wherein the ratchet includes a first leg and a second leg with a recess defined therebetween for receiving the striker.

3. The locking assembly of claim 2 wherein the first leg and the second leg inhibit movement of the striker and thereby inhibit movement of the first vehicle part.

4. The locking assembly of claim 3 wherein rotation of ratchet, when the striker is locked by the ratchet, is prevented in a first rotatable direction by the pawl and is prevented in a second, opposite rotatable direction by the spring.

5. The locking assembly of claim 4 wherein the spring is engaged with the anti-rattle lever when the striker is locked by the ratchet and a small clearance gap is defined between the second leg of the ratchet and the spring such that the spring only engages the second leg of the ratchet in the event that the anti-rattle lever fails.

6. The locking assembly of claim 1 wherein the spring is a torsion spring rotatably mounted to the second vehicle part, a rotatable spring axis of the torsion spring parallel to a rotatable ratchet axis of the ratchet.

7. The locking assembly of claim 6 wherein the torsion spring has one end arranged to be in contact with the anti-rattle lever.

8. The locking assembly of claim 7 wherein said one end is arranged to be slightly spaced apart from the ratchet and only contacts the ratchet in the event that the anti-rattle lever fails.

9. The locking assembly of claim 7 wherein the torsion spring has another end arranged to be in contact with the pawl.

10. The locking assembly of claim 1 wherein the spring has one end arranged in a Z-shaped configuration with a center portion arranged to extend across a contact area of the ratchet and a distal portion arranged to end along a contact area of the anti-rattle lever.

11. The locking assembly of claim 1 wherein the first vehicle part is one of a vehicle seat back and a vehicle body portion to which the vehicle seat back is lockable and the second vehicle part is the other of the vehicle seat back and the vehicle body portion to which the vehicle seat back is lockable.

12. The locking assembly of claim 1 wherein the ratchet is formed of a metal or metal alloy and the anti-rattle lever is formed of a plastic material.

13. A vehicle seat locking assembly for maintaining integrity of a locking condition in the event of a failure of an anti-rattling feature, comprising:
 a striker mounted to one of a vehicle seat and a vehicle body portion to which the vehicle seat is lockable;
 a ratchet rotatably mounted to other of the vehicle seat and the vehicle body portion, the ratchet movable between a first position wherein the striker is movable relative to the ratchet and a second position wherein the striker is inhibited from moving relative to the ratchet;
 a pawl rotatably mounted to the same one of the vehicle seat and the vehicle body portion as the ratchet, the pawl arranged to selectively lock the ratchet in the second position;
 an anti-rattle lever contacting the striker when the striker is locked by the ratchet with the ratchet in the second position, the anti-rattle lever inhibiting rattling between the striker and the ratchet; and
 a spring arranged to urge the anti-rattle lever into contact with the striker and further arranged to engage the ratchet if the anti-rattle lever breaks.

14. The vehicle seat locking assembly of claim 13 wherein the ratchet is U-shaped with a first leg positioned on one side of the striker when the ratchet is in the second position and a second leg positioned on the other side of the striker when the ratchet is in the second position, the spring having one end arranged adjacent the second leg with a small clearance defined therebetween.

15. The vehicle seat locking assembly of claim 13 wherein the ratchet is formed of a metal or metal alloy and the anti-rattle lever is formed of a plastic material.

16. The vehicle seat locking assembly of claim 13 wherein the spring is a torsion spring having a torsion spring axis arranged in parallel with an axis of rotation of the ratchet and the anti-rattle lever, the torsion spring having one end with a Z-shaped configuration to bridge over the ratchet while defining a small clearance therewith and configured to engage a side of the anti-rattle lever opposite the striker to thereby urge the anti-rattle lever toward the striker.

17. The vehicle seat locking assembly wherein the striker is mounted to the vehicle seat and the vehicle body portion is a parcel shelf structure arranged behind the vehicle seat.

18. The locking assembly of claim 1 wherein one end of the spring is arranged to be in contact with the anti-rattle lever to urge the anti-rattle lever into contact with the striker when the ratchet is locked to the striker, said one end having a ratchet engagement portion arranged to contact the ratchet in the event that the anti-rattle lever fails but normally arranged in spaced apart relation relative to the ratchet.

19. The locking assembly of claim 18 wherein another end of the spring is arranged to be in contact with the pawl so that the spring urges the pawl in a rotatable direction wherein the pawl locks the ratchet.

20. The locking assembly of claim 18 wherein the ratchet is formed of a metal or metal alloy and the anti-rattle lever is formed of a plastic material.

\* \* \* \* \*